(12) United States Patent
Angelo et al.

(10) Patent No.: US 7,382,880 B2
(45) Date of Patent: Jun. 3, 2008

(54) METHOD AND APPARATUS FOR INITIALIZING MULTIPLE SECURITY MODULES

(75) Inventors: Michael F. Angelo, Houston, TX (US); Larry N. McMahan, Fremont, CA (US); Richard D. Powers, Highland Village, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 825 days.

(21) Appl. No.: 10/764,966

(22) Filed: Jan. 26, 2004

(65) Prior Publication Data

US 2005/0163317 A1 Jul. 28, 2005

(51) Int. Cl.
*H04L 9/00* (2006.01)
(52) U.S. Cl. ...................................... 380/259
(58) Field of Classification Search ................ 380/282, 380/259; 713/155
See application file for complete search history.

(56) References Cited

U.S. PATENT DOCUMENTS

| | | | |
|---|---|---|---|
| 5,101,492 A | 3/1992 | Schultz et al. | |
| 5,159,533 A | 10/1992 | Kuang | |
| 5,175,670 A | 12/1992 | Wang | |
| 5,224,019 A | 6/1993 | Wong et al. | |
| 5,249,279 A | 9/1993 | Schmenk et al. | |
| 5,271,152 A | 12/1993 | Murphy | |
| 5,331,646 A | 7/1994 | Krueger et al. | |
| 5,333,305 A | 7/1994 | Neufeld | |
| 5,363,273 A | 11/1994 | Ma | |
| 5,408,644 A | 4/1995 | Schneider et al. | |
| 5,440,716 A | 8/1995 | Schultz et al. | |
| 5,490,342 A | 2/1996 | Rutterman | |
| 5,522,065 A | 5/1996 | Neufeld | |
| 5,559,883 A * | 9/1996 | Williams | 726/13 |
| 5,586,274 A | 12/1996 | Bryg et al. | |
| 5,592,648 A | 1/1997 | Schultz et al. | |
| 5,668,971 A | 9/1997 | Neufeld | |
| 5,737,744 A | 4/1998 | Callison et al. | |
| 5,748,888 A | 5/1998 | Angelo et al. | |

(Continued)

FOREIGN PATENT DOCUMENTS

EP 0674273 A1 9/1995

(Continued)

OTHER PUBLICATIONS

U.S. Appl. No. 10/660,335, Angelo et al.

(Continued)

*Primary Examiner*—Kambiz Zand
*Assistant Examiner*—Andrew L Nalven

(57) ABSTRACT

A method and apparatus for initializing multiple security modules are provided. The method may comprise the acts of determining if the security module is a controlling security module or a subordinate security module, generating at least one key if the security module is the controlling security module, and receiving at least one key from another security module if the security module is the subordinate security module. The apparatus may comprise a detector that is adapted to determine if the security module is a controlling security module or a subordinate security module, a key generator that generates a key for the security module if the security module is the controlling security module, and a key receiver that receives a key from another security module if the security module is the subordinate security module.

35 Claims, 7 Drawing Sheets

U.S. PATENT DOCUMENTS

| | | | |
|---|---|---|---|
| 5,748,940 A | 5/1998 | Angelo et al. | |
| 5,778,070 A | 7/1998 | Mattison | |
| 5,822,184 A | 10/1998 | Rabinovitz | |
| 5,844,986 A | 12/1998 | Davis | |
| 5,848,418 A | 12/1998 | de Souza et al. | |
| 5,850,559 A | 12/1998 | Angelo et al. | |
| 5,859,911 A | 1/1999 | Angelo et al. | |
| 5,887,131 A | 3/1999 | Angelo | |
| 5,909,691 A | 6/1999 | Schultz et al. | |
| 5,923,754 A | 7/1999 | Angelo et al. | |
| 5,944,821 A | 8/1999 | Angelo | |
| 5,949,882 A | 9/1999 | Angelo | |
| 5,953,422 A | 9/1999 | Angelo et al. | |
| 5,955,722 A | 9/1999 | Kurz et al. | |
| 5,960,084 A | 9/1999 | Angelo | |
| 5,974,250 A | 10/1999 | Angelo et al. | |
| 5,974,438 A | 10/1999 | Neufeld | |
| 6,003,144 A | 12/1999 | Olarig et al. | |
| 6,009,524 A | 12/1999 | Olarig et al. | |
| 6,026,016 A | 2/2000 | Gafken | |
| 6,032,257 A | 2/2000 | Olarig et al. | |
| 6,057,965 A | 5/2000 | Angelo et al. | |
| 6,061,794 A | 5/2000 | Angelo et al. | |
| 6,085,299 A | 7/2000 | Angelo et al. | |
| 6,116,509 A | 9/2000 | Angelo et al. | |
| 6,118,589 A | 9/2000 | Angelo et al. | |
| 6,119,228 A | 9/2000 | Angelo et al. | |
| 6,125,446 A | 9/2000 | Olarig et al. | |
| 6,131,174 A | 10/2000 | Fischer et al. | |
| 6,134,591 A | 10/2000 | Nickles | |
| 6,167,538 A | 12/2000 | Neufeld et al. | |
| 6,182,892 B1 | 2/2001 | Angelo et al. | |
| 6,199,167 B1 | 3/2001 | Heinrich et al. | |
| 6,263,431 B1 | 7/2001 | Lovelace | |
| 6,288,843 B1 | 9/2001 | Angelo et al. | |
| 6,298,411 B1 | 10/2001 | Giacalone | |
| 6,308,265 B1 | 10/2001 | Miller | |
| 6,311,273 B1 | 10/2001 | Helbig, Sr. et al. | |
| 6,330,674 B1 | 12/2001 | Angelo | |
| 6,363,449 B1 | 3/2002 | Side et al. | |
| 6,370,649 B1 | 4/2002 | Angelo et al. | |
| 6,400,823 B1 | 6/2002 | Angelo | |
| 6,401,208 B2 | 6/2002 | Davis et al. | |
| 6,418,533 B2 | 7/2002 | Angelo et al. | |
| 6,442,631 B1 | 8/2002 | Neufeld et al. | |
| 6,460,121 B1 | 10/2002 | Bonola | |
| 6,463,495 B1 | 10/2002 | Angelo et al. | |
| 6,467,048 B1 | 10/2002 | Olarig et al. | |
| 6,470,443 B1 | 10/2002 | Emer et al. | |
| 6,477,648 B1 | 11/2002 | Schell et al. | |
| 6,480,097 B1 * | 11/2002 | Zinsky et al. | 340/5.8 |
| 6,502,203 B2 | 12/2002 | Barron et al. | |
| 6,505,268 B1 | 1/2003 | Schultz et al. | |
| 6,567,901 B1 | 5/2003 | Neufeld | |
| 6,581,162 B1 | 6/2003 | Angelo et al. | |
| 6,609,204 B1 | 8/2003 | Olarig et al. | |
| 6,625,729 B1 | 9/2003 | Angelo et al. | |
| 6,625,730 B1 | 9/2003 | Angelo et al. | |
| 6,633,978 B1 | 10/2003 | Angelo et al. | |
| 6,647,415 B1 | 11/2003 | Olarig et al. | |
| 6,948,065 B2 * | 9/2005 | Grawrock | 713/168 |
| 7,069,449 B2 * | 6/2006 | Weaver et al. | 713/193 |
| 7,095,859 B2 * | 8/2006 | Challener | 380/282 |
| 2003/0177401 A1 * | 9/2003 | Arnold et al. | 713/202 |
| 2004/0181327 A1 * | 9/2004 | Tsosie | 701/36 |
| 2004/0205341 A1 * | 10/2004 | Brickell | 713/168 |

FOREIGN PATENT DOCUMENTS

| | | | |
|---|---|---|---|
| EP | 0674273 B1 | 5/2000 | |
| EP | 0851335 B1 | 10/2003 | |

OTHER PUBLICATIONS

"Trusted Computing Platform Alliance (TCPA) Trusted Platform Module Protection Profile," Version 1.9.7, Published Jul. 1, 2002 (Prepared by TCPA Membership).

"Trusted Computing Group (TCG) Main Specification," Version 1.1a, Published Sep. 2001 (Prepared by Trusted Computing Group).

Angelo et al., "Method and Apparatus to Provide Enhanced Computer Protection," U.S. Appl. No. 09/540,697, filed Mar. 31, 2000.

Angelo et al., "Method and Apparatus to Provide Enhanced Computer Security," U.S. Appl. No. 09/540,812, filed Mar. 31, 2000.

Angelo et al., "Computer System Having Security Features," U.S. Appl. No. 09/540,811, filed Mar. 31, 2000.

Neufeld, E. David, "Method and Apparatus for Preserving the Integrity of Management Subsystem Environment," U.S. Appl. No. 09/967,268, filed Sep. 28, 2001.

Neufeld, et al., "Method and Apparatus for Generating a Strong Random Number for Use in a Security Subsystem for a Processor-Based Device," U.S. Appl. No. 09/966,890, filed Sep. 28, 2001.

Brown et al., "Method and Apparatus for Preserving a Strong Random Number Across Battery Replacement in a Security Subsystem," U.S. Appl. No. 10/037,511, filed Jan. 4, 2002.

Franz et al., "Method and Apparatus for Initiating Strong Encryption Using Existing SSL Connection for Secure Key Exchange," U.S. Appl. No. 10/037,491, filed Jan. 4, 2002.

Reeves et al., "Virtual Media from a Directory Service," U.S. Appl. No. 10/038,239, filed Jan. 4, 2002.

Reeves et al., "Method and Apparatus for Increasing the Functionality and Ease of Use of Lights Out Management in a Directory Enabled Environment," U.S. Appl. No. 10/037,684, filed Jan. 4, 2002.

Franz et al., "Method and Apparatus for Identifying the Write Protect Status of a Diskette," U.S. Appl. No. 10/043,478, filed Jan. 10, 2002.

Angelo et al., "Method and Apparatus for Using a MAC Address as Unique Machine Parameters to Identify Equipment," U.S. Appl. No. 10/184,146, filed Jun. 28, 2002.

Neufeld et al., "Method and Apparatus to Provide Secure Communications Between Systems," U.S. Appl. No. 10/632,500, filed Aug. 1, 2003.

* cited by examiner

METHOD AND APPARATUS FOR INITIALIZING MULTIPLE SECURITY MODULES

BACKGROUND OF THE RELATED ART

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

In the field of processor-based systems, such as computer systems, it may be desirable for information to be transferred from one system to another system via a network. Networks may be arranged to allow information, such as files or programs, to be shared across an office, a building, or any geographic boundary. While these networks may be used to increase productivity, they also expose computer systems to security risks, such as interception of confidential data by unauthorized parties, loss of data integrity, unauthorized access to computer systems on the network, and the like.

A wide variety of security measures may be employed to secure data in a networked environment. For example, security components or modules may be used to attest to the settings within the computer system. In other words, the security modules may certify the validity of the computer system as a system that may be trusted by other systems. Such a security module may maintain records that relate to components and devices that are utilized by the computer system. These records, which may be encrypted with keys to prevent unauthorized access and/or may be managed by an administrator who is able to control the configuration of the computer system. However, if multiple security modules are utilized in a single computer system, each security module may contain incompatible data, which may be undecipherable by the computer system or other security modules. The data is incompatible because each security module may have a different perspective (i.e. may store differently encrypted data) of the information within the computer system and/or the operating environment of the computer system. These differences in perspective may result in conflicts that prohibit effective operation of the computer system.

For example, if two security modules are utilized in a computer system, each of the security modules may have different information that relates to the configuration of the computer system because each security module may have its own keys to encrypt the information that relates to the computer system. If one of the security modules is damaged, access to the information that was stored in or for the security module may not be obtainable. As such, the loss of a single security module may hinder the operation of the computer system as a whole and prevent access to specific information within the computer system.

In addition, with multiple security modules in a single computer system, the security modules may not be able to determine which security module is the controlling security module. As a result, the security modules may be unable to coordinate the operation of multiple security modules within a single computer system. Also, an administrator of the computer system may not be able to determine which security module is being utilized by the computer system. This problem may hinder maintenance or troubleshooting of the computer system.

BRIEF DESCRIPTION OF THE DRAWINGS

Exemplary embodiments of the present invention may be apparent upon reading of the following detailed description with reference to the drawings in which.

DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The Trusted Computing Platform Alliance, which includes the assignee of the present application, is developing specifications that are intended to improve security for computing systems. Two such specifications under development are the Trusted Computing Platform Alliance Trusted Platform Module Protection Profile Specification and the Trusted Computing Group ("TCG") Main Specification, which are hereby incorporated by reference. These specifications refer to a trusted platform module ("TPM"), which is defined as a module that includes protected functionality and shielded locations.

Embodiments of the present invention may provide a methodology for initializing multiple security modules, such as TPMs, in a computer system. A lock bit may be employed in a multiple TPM environment to determine the TPM that is the controlling TPM. The lock bit may be located in non-volatile memory, and be accessible by various TPMs within the computer system. By utilizing the lock bit, one TPM may generate keys and measure the computer system. The keys and measured system information may be copied into the other TPMs. As a result, each of the TPMs may share a common view of the computer system and provide fault tolerance in the event of the failure of one of the TPMs. In other words, the TPMs may each have consistent information and be able to function compatibly with each other. Thus, the computer system may implement multiple TPMs to provide redundancy and enhance the operation of the computer system.

Figure 1:
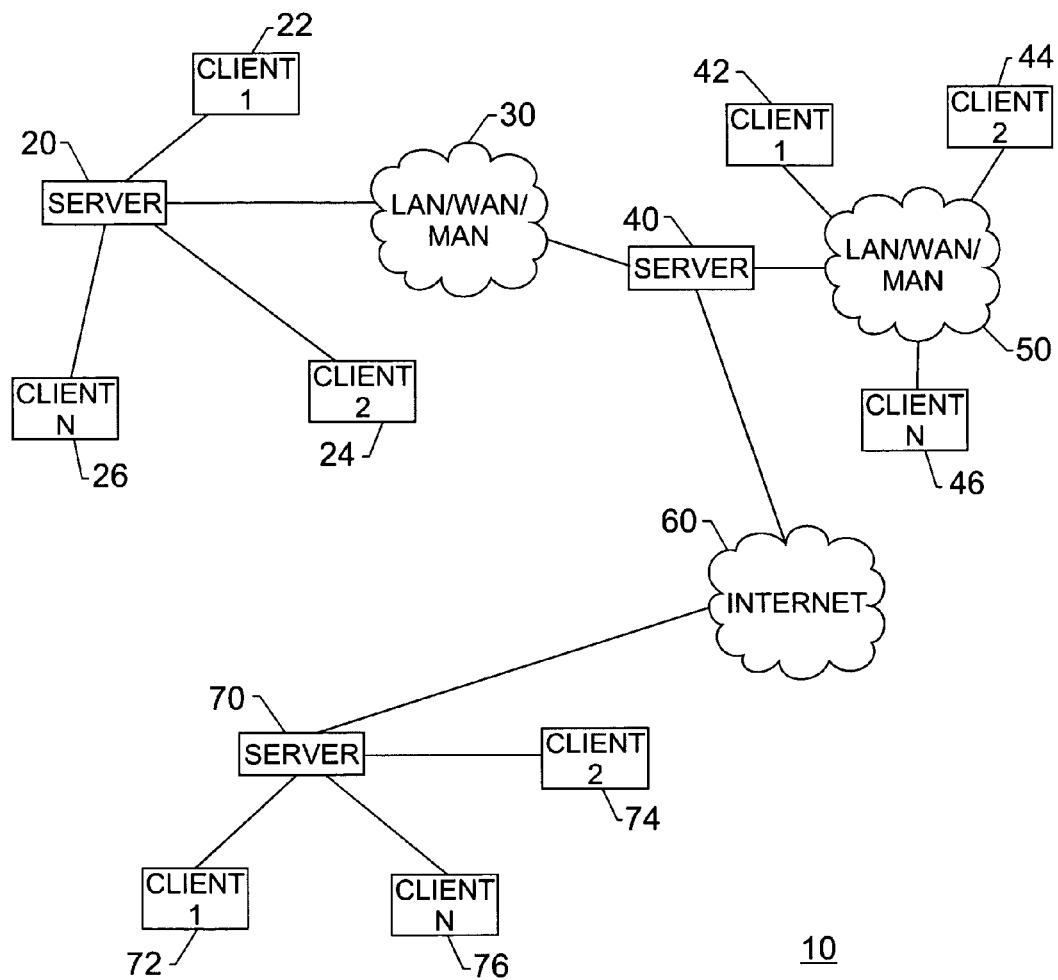
FIG. 1 is a block diagram illustrating a network in accordance with embodiments of the present invention.

Referring initially to FIG. 1, a block diagram of a computer network architecture is illustrated and designated using a reference numeral 10. A server 20 may be connected to a plurality of client computers 22, 24 and 26. The server 20 may be connected to as many as "n" different client computers. The magnitude of "n" may be a function of the computing power of the server 20. Each client computer in the network 10 may be a functional client computer and may be a desktop personal computer ("PC"), a notebook PC, a tablet PC, a personal digital assistant ("PDA"), or the like.

The server 20 may be connected via a network infrastructure 30, which may include a combination of hubs, switches, routers, or the like. While the network infrastructure 30 is illustrated as being either a local area network ("LAN"), a wide area network ("WAN"), or a metropolitan area network ("MAN"), those skilled in the art will appreciate that the network infrastructure 30 may assume other forms or may even provide network connectivity through the Internet. As described below, the network 10 may include other servers as well, which may be dispersed geographically with respect to each other to support client computers in other locations.

The network infrastructure 30 may connect the server 20 to a server 40, which may be representative of any other server in the network environment. The server 40 may be connected to one or more client computers 42, 44, and 46. As illustrated in FIG. 1, a network infrastructure 50, which may include a LAN, a WAN, a MAN, or other network configuration, may be used to connect the client computers 42, 44 and 46 to the server 40. The server 40 may additionally be connected to the Internet 60, which may be connected to a server 70. The server 70 also may be connected to one or more client computers 72, 74 and 76.

In the network infrastructures 30, 50 and 60, the systems, such as the client computers 22-26, 42-46 and 72-76 and servers 20, 40, 70, may be subject to improper access attempts, such as hacker attacks, disruption of service attacks, introduction of malicious code, viruses and the like. These attacks may result in a loss of productivity, revenue, data, and/or confidential information that is stored on one of the systems. To protect the data and the system, security modules, such as TPMs, may be utilized to provide enhanced security. An exemplary security module, which provides this functionality, is illustrated in FIG. 2.

Figure 2:
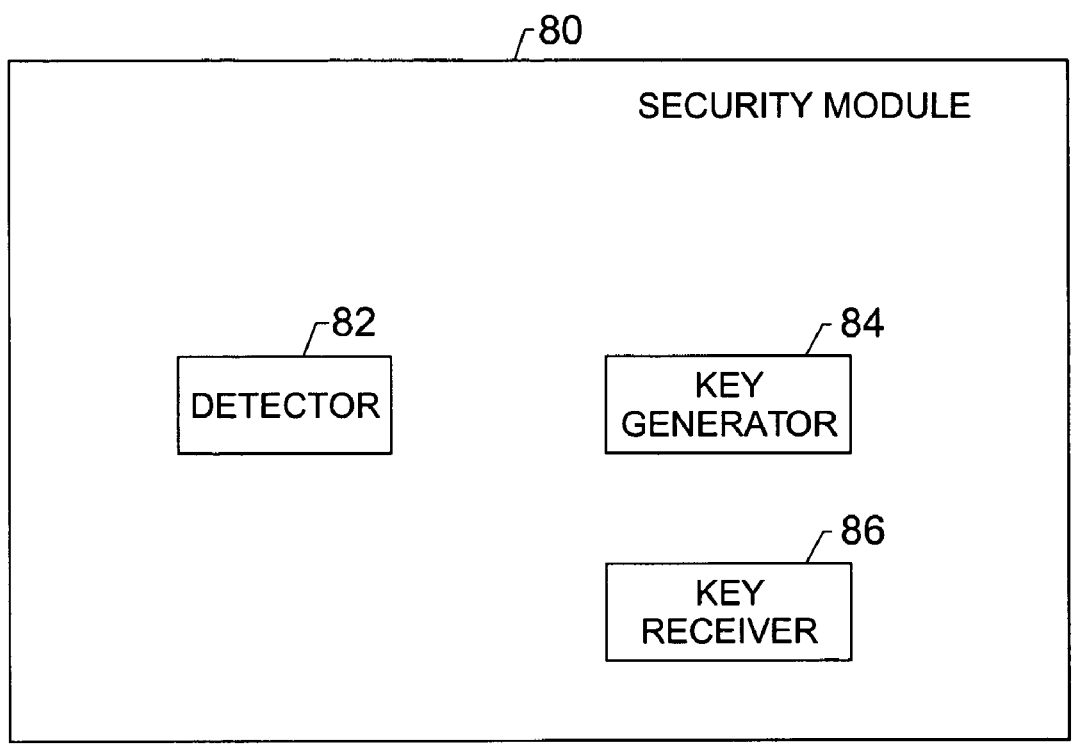
FIG. 2 is a block diagram illustrating an exemplary security module in accordance with embodiments of the present invention.

FIG. 2 is a block diagram of an exemplary security module in accordance with the present invention. The security module 80 may include various components, such as a detector 82, a key generator 84, and a key receiver 86 along with other components (not shown). The detector 82, the key generator 84, and the key receiver 86 may be hardware, software, or any combination thereof, which may be individual components or combined into a single device. The detector 82 may be utilized to determine if the security module 80 is a controlling security module or a subordinate security module, which is discussed below in greater detail. The key generator 84 may generate a key or keys for the security module if the security module is the controlling security module. The key generator 84 may be utilized to encrypt information to be stored on the system or even within the security module 80. Also, a key receiver 86 may receive a key or keys from the controlling security modules if the security module is the subordinate security module. The use and interaction of these various components is further explained below.

These various components 82-86 may be utilized by the security module 80 to enhance the security of the system. For example, each of the client computer systems and servers, which are described in FIG. 1, may include a TPM to provide integrity for that system on the network. However, with a single TPM, the user may lose access to the system if the TPM fails. As such, to provide fault tolerance, multiple TPMs may be implemented within a system to enhance the security and reliability of the system.

Figure 3:
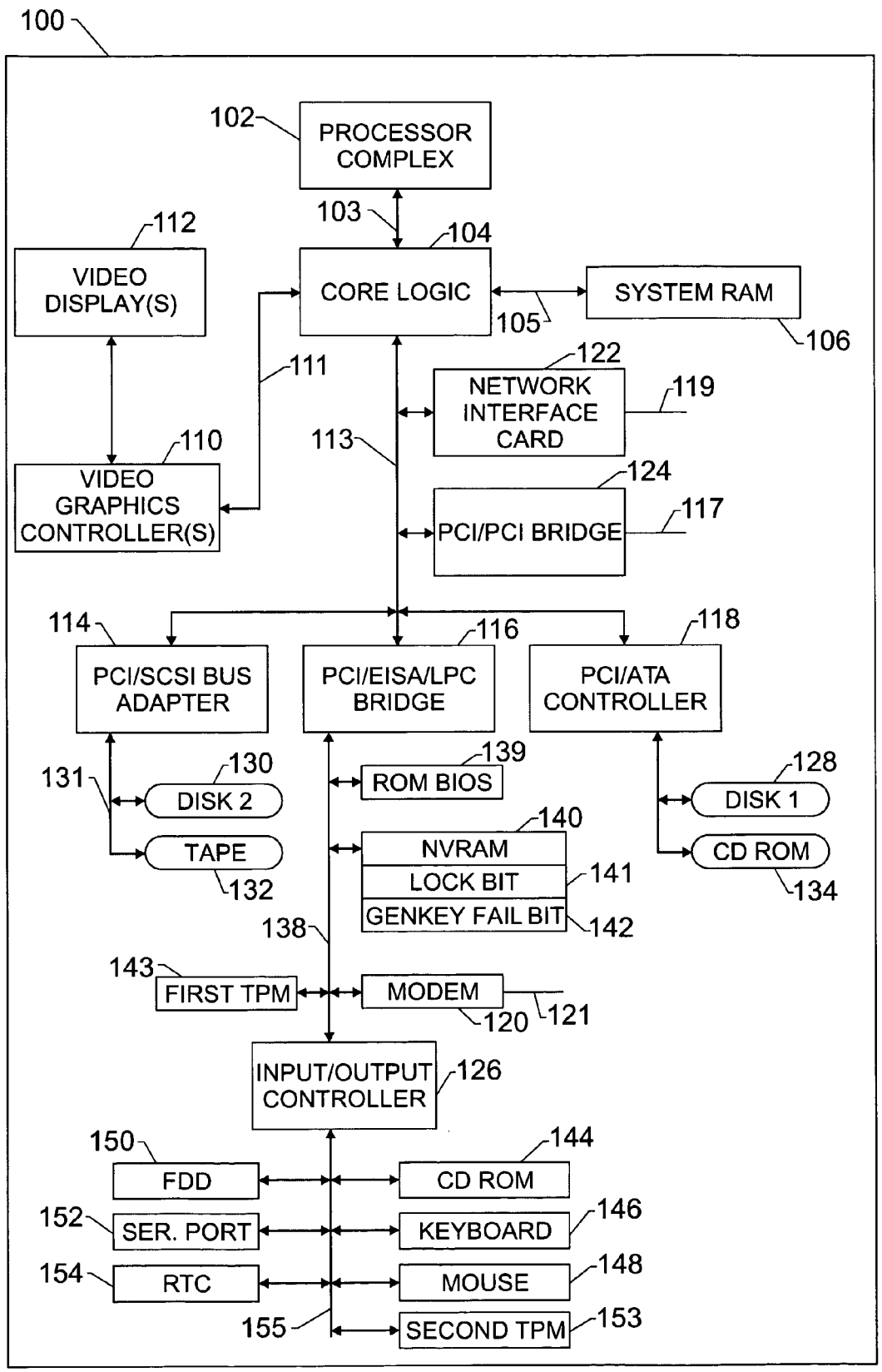
FIG. 3 is a block diagram illustrating a computer system with multiple security modules in a network in accordance with embodiments of the present invention.

FIG. 3 is a block diagram illustrating an exemplary computer system with multiple security modules in accordance with embodiments of the present invention. The computer system is generally referred to by the reference numeral 100. The architecture of the computer system 100 is given for purposes of illustration only, as one example of a computer system in which embodiments of the present invention may be employed. Additionally, it should be appreciated that any number of security modules, such as security modules 80 or TPMs, may be utilized by the system 100, and connected in a variety of locations within the computer system 100. Two security modules are depicted in the system illustration in FIG. 3.

The computer system 100 may comprise a processor complex 102, which may include one or more central processing units ("CPUs"). A core logic chipset 104, which may manage a variety of functions on behalf of the processor complex 102, may be connected to the processor complex via a processor interface point-to-point link or a processor bus 103.

The core logic chipset 104 may be connected via memory bus 105 to a system random access memory 106, which may comprise static random access memory ("SRAM"), dynamic random access memory ("DRAM") or other suitable memories. The memory 106 may be a shared system memory to hold memory resident files or information. A video graphics controller 110 may be connected to the core logic chipset 104 via a video bus 111 to provide a signal that produces a display image on a video display 112.

A bus 113, such as a peripheral component interface ("PCI") bus or the like, may connect the core logic chipset 104 to a variety of system devices, such as a network interface card 122 and a PCI/PCI bridge 124. The network interface card 122 may provide communication capability to the computer system 100 via a communication bus 119. The communication bus 119 may be connected to other computer systems, as discussed above. The PCI/PCI bridge 124 may provide capacity for additional PCI devices on a PCI bus 117.

A PCI/SCSI bus adapter 114 may provide access to SCSI devices such as a disk drive 130 and a tape drive 132 via a SCSI bus 131. A PCI/ATA controller 118 may provide access to additional devices, such as a disk drive 128 and a CD ROM drive 134. A PCI/EISA/LPC bridge 116 may provide access to system devices, such as a read only memory basic input/output system ("ROM BIOS") 139, a non-volatile memory ("NVRAM") 140, a modem 120, a first trusted platform module ("TPM") 143 or the like via a bus 138. The operation of the first TPM 143 is discussed below in greater detail. Also, the NVRAM 140 may include flash memory or the like and may include a lock bit 141 and/or a genkey fail bit 142. The operation of the lock bit 141 and the genkey fail bit 142 are also discussed below. The BIOS 139 may also be system firmware that is stored in ROM. The BIOS 139 may be referred to as the core root of trust for measurement ("CRTM"), which is the basis for insuring the integrity of the computer system 100. As such, the BIOS 139 provides the foundation for trust, which makes and reports trust measurements of components external to the first TPM 143. The measurements may include cryptographically hashing code or configurations to create integrity metrics for the TPM. The modem 120 may provide communication access via a phone line 121. An input/output controller 126, which may be connected to the bus 138, may provide access to system devices such as a CD ROM drive 144, a keyboard 146, a mouse 148, a floppy disk drive 150, a serial port 152, a second TPM 153, a real time clock ("RTC") 154, and the like, via a bus 155.

The TPMs 143 and 153 may provide the computer system 100 with enhanced security because they may be used to validate the BIOS or system firmware along with other code. The TPMs 143 and 153 may include an input/output interface, a processor, and memory, routines, for example. These various components may be utilized to perform the functionality of the detector 82, the key generator 84, and the key receiver 86, which are discussed above in FIG. 2. The input/output interface may be utilized by the TPMs 143 and 153 to communicate with other components within the computer system 100 or to receive power. The processor in the TPMs 143 and 153 may be utilized to provide cryptographic capabilities, such as hashing, random number generation, key generation, and encryption/decryption. The memory may be divided into registers and other memory sections, which may be utilized to store the keys and hashed information relating to code or configurations of the computer system 100. Because each of the TPMs 143 and 153 operate with the computer system 100, the TPMs 143 and 153 may use routines to attest to the integrity of the computer system 100. In other words, the TPMs 143 and 153 may certify that the computer system 100 is a valid system that may be trusted by other systems.

To provide enhanced security and establish root trust for the computer system, various security measures may be performed by the TPMs 143 and 153. For instance, each TPM may include endorsement keys, which are a private and public key pair that are used to encrypt/decrypt information. The endorsement keys may be unique to a particular TPM, and may be assigned to the TPM when it is manufactured. Also, an attestation identity key may be used to provide platform authentication along with a user key that may be used to provide privacy to a user of the TPMs 143 and 153. In addition to the keys, the TPMs 143 and 153 may include hashing capabilities and a random number generator to further enhance the security of the computer system by hashing information, such as code or configuration information about one or more system components.

The TPMs 143 and 153 may follow an initialization when they are first activated within the computer system 100. This initialization, which shall be referred to as TPM initialization, is different from the initialization that is performed on all devices in a computer system when the computer system is booted. That initialization shall be referred to as system initialization. During the TPM initialization, which is a routine performed by the TPM, system state information and keys may be stored in the memory of the TPM. The TPM initialization process may include the validation of the BIOS 139 by the TPM 143 or 153 to establish trust with the BIOS 139, and the validation of other code and configurations by the BIOS 139 to build trust within the computer system 100. During the TPM initialization process, the ownership and identity of the TPM 143 or 153 in relation to the computer system 100 may be established. Ownership may be established by providing or generating keys for the TPM 143 or 153 and measuring the code and configuration of the computer system 100. The TPM initialization process is shown in greater detail in FIG. 4.

Figure 4:
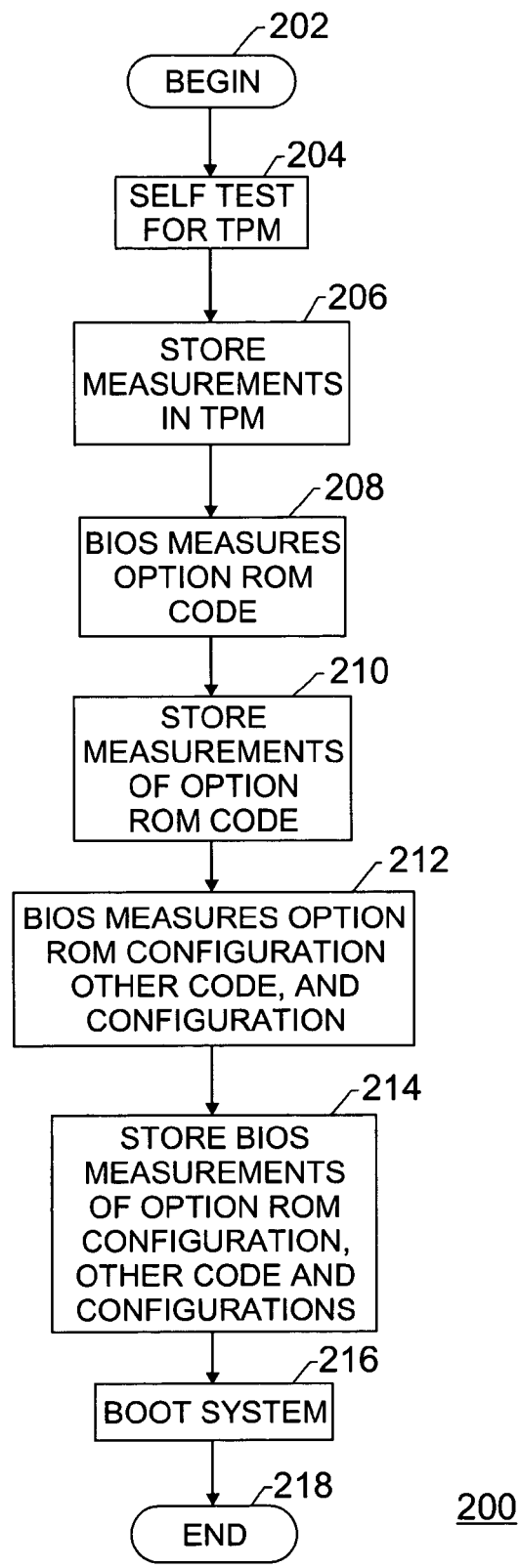
FIG. 4 is a process flow diagram illustrating the initialization of a security module in accordance with embodiments of the present invention.

In FIG. 4, which is generally referred to by reference numeral 200, an exemplary initialization process of a TPM (i.e. TPM initialization), such as the TPMs 143 or 153 (FIG. 3), is shown. Each TPM in a given system may undergo the TPM initialization process illustrated in FIG. 4. The process begins at block 202. At block 204, the TPM may perform a self-test. The self-test may include verifying the operation of the internal components and information within the TPM. During the self-test, the TPM may generate keys, such as endorsement keys, for example. The keys may include private and public keys that may be used by the TPM to encrypt/decrypt different information. In addition, the self-test may include measuring various code or configurations, such as the BIOS 139 (FIG. 3), which may include other system firmware, and the BIOS boot block, if present. The measurement of a command or code may include cryptographically hashing the code to create integrity metrics. The hash may be a digital signature that provides authentication for the specific TPM through the use of private keys. At block 206, the TPM may store the measurements in its internal memory. The measurements may be stored in specific registers that are utilized by the TPM to store information relating to code or configurations, such as the BIOS and/or BIOS boot block, if present.

Once the BIOS has been measured by the TPM, the BIOS may be utilized to measure option read-only memory ("ROMs") and hardware, as shown in block 208. The option ROM may include programs associated with devices attached to system buses. The hardware may include various buses or devices within the computer system, as discussed above in FIG. 3. At block 210, the measurements from the BIOS of the option ROMs and hardware are stored within the TPM. Then, the BIOS may measure the option ROM configuration, other code and configurations, as shown in block 212. The other code and configurations may include the operating system ("OS") loader, the disk boot record, other code and data utilized to prepare the OS, state transitions, and/or wake events. After the measurements are made, the TPM may store the measurements in its internal memory, as shown in block 214. Next, the computer system boots, as shown in block 216. The booting of the system may include activating or handing control of the system to the operating system. The process ends at block 218.

If multiple TPMs are deployed within a computer system, each TPM may have different measurement information stored in its internal memory. This information may be referred to as the "perspective" of the TPM. The perspectives of the TPMs may differ because each TPM has different keys that are utilized to measure the system. If the TPMs within a system have different perspectives, system incompatibilities may result. For example, one of the TPMs cannot be used to back up the other TPM because the information within each TPM is unique.

Accordingly, for each of the TPMs to have the same perspective, the keys from one TPM may be copied into the other TPM. However, when the TPMs are initializing, it is unclear which TPM is the controlling TPM for the system. In other words, it may be unclear which TPM is supposed to copy its keys to the other TPMs. As a result, inconsistencies may appear because each of the TPMs may attempt to copy keys into the other TPM. The inconsistencies may result in synchronicity issues that may degrade the performance of the system. In addition, an administrator of the system may not know which TPM is being utilized by the system. As a result, maintenance or troubleshooting of the system may be hindered. Accordingly, because it is unclear which TPM may be utilized to copy the keys into the other subordinate TPM, a mechanism for coordinating the TPMs may be utilized to prevent any inconsistencies or arbitrate between the TPMs within the system.

Figure 5:
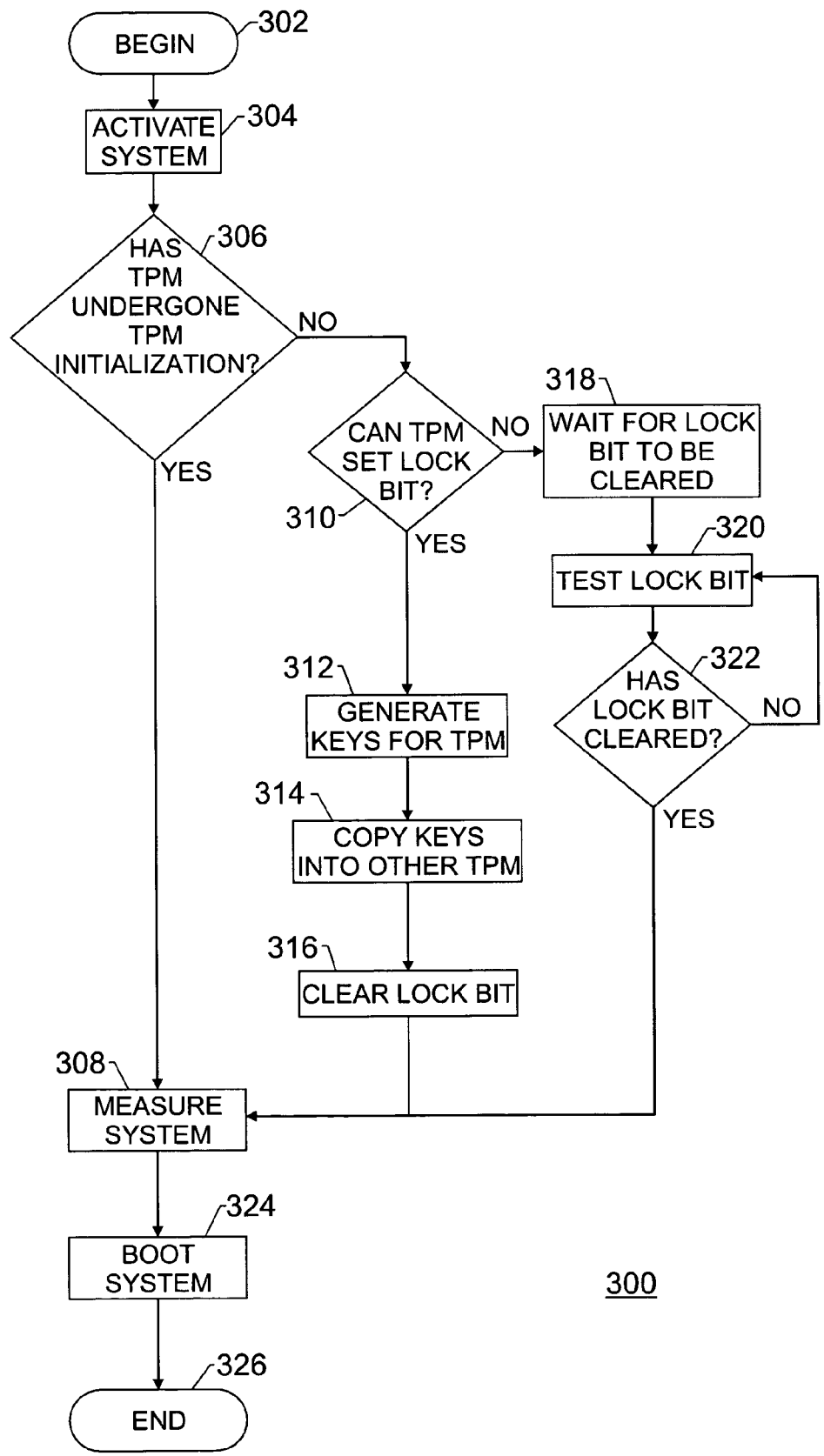
FIG. 5 is a process flow diagram illustrating the use of a lock bit to coordinate the initialization of multiple trusted platform modules in accordance with embodiments of the present invention.

FIG. 5 is a process flow diagram illustrating the use of a lock bit to coordinate the initialization of multiple trusted platform modules in accordance with embodiments of the present invention. The process is generally referred to by reference numeral 300. To coordinate the initialization of the TPMs, each TPM within the system may access a lock bit, which may be a setting or attribute stored in memory, such as the NVRAM 140 (FIG. 3). One of the TPMs may set the lock bit to indicate that it is the controlling TPM for the computer system. The TPM that sets the lock bit may be the first TPM to access the lock bit, the TPM associated with the processor, or other factors may be used to determine the controlling TPM. Beneficially, by utilizing the lock bit, each TPM may determine if it is the controlling TPM or a subordinate TPM. After a controlling TPM is established, the keys from the controlling TPM may be copied into the other TPMs to allow the TPMs to have the same perspective of the system. With the same perspective, each of the TPMs may act as a back up for the other TPMs. Also, the inconsistencies encountered during the initialization process may be prevented because the lock bit is used to determine the TPM that provides the keys to the other TPMs.

The process begins at block 302. At block 304, the computer system may be activated by supplying power to multiple TPMs. The activation of the system may include providing power to various modules coupled to the system, such as the TPMs. Each TPM in the system may perform the process illustrated in FIG. 4. At block 306, the TPM may determine whether it has undergone the process of TPM initialization. If the TPM has previously undergone TPM initialization, it may utilize the information and keys within itself to measure the system, as shown in block 308. The measuring of the system may include the measurement of code and configurations, as previously discussed in blocks 204-214 (FIG. 3).

If a TPM has not previously undergone TPM initialization, then it may utilize the lock bit to determine whether it is the controlling TPM. At block 310, the TPM may determine if it can set the lock bit. The determination may include accessing and changing the lock bit in memory. The lock bit may include a setting or specific value that is located in memory, such as system RAM 106 or NVRAM 140 (FIG. 3). The lock bit may be accessible by the TPMs that are coupled to the system to allow each TPM to determine if it is the controlling or subordinate TPM. If the lock bit can be set by the TPM, then that TPM may be defined as the controlling TPM. As shown in block 312, the controlling TPM may then generate keys that may be used to hash or measure code in the system. The code may include the BIOS, the BIOS boot block, or other code and configurations, as discussed above. At block 314, the keys may be copied into the other (subordinate) TPMs within the system. Once the keys are copied into the other TPMs, the lock bit may be cleared, as shown in block 316. Then, the TPM may measure the system in block 308, as discussed above.

However, if the lock bit cannot be set by a TPM during initialization, then that TPM may be defined to be a subordinate TPM. The subordinate TPM may wait for the lock bit to be cleared in block 318. Then, the subordinate TPM may test the lock bit, as shown in block 320. At block 322, the TPM may determine if the lock bit has been cleared. To clear the lock bit, the controlling TPM may alter the information or setting within the memory. If the lock bit indicates that it is still set, then the subordinate TPM may test the lock bit again, as shown in block 320. However, if the lock bit has been cleared, then the subordinate TPM may measure the computer system, as shown in block 308. Once the computer system is measured, the TPM may boot the computer system, as shown in block 324. The booting of the computer system may be similar to the discussion of block 216 above. Accordingly, the process ends at block 326.

Figure 6:
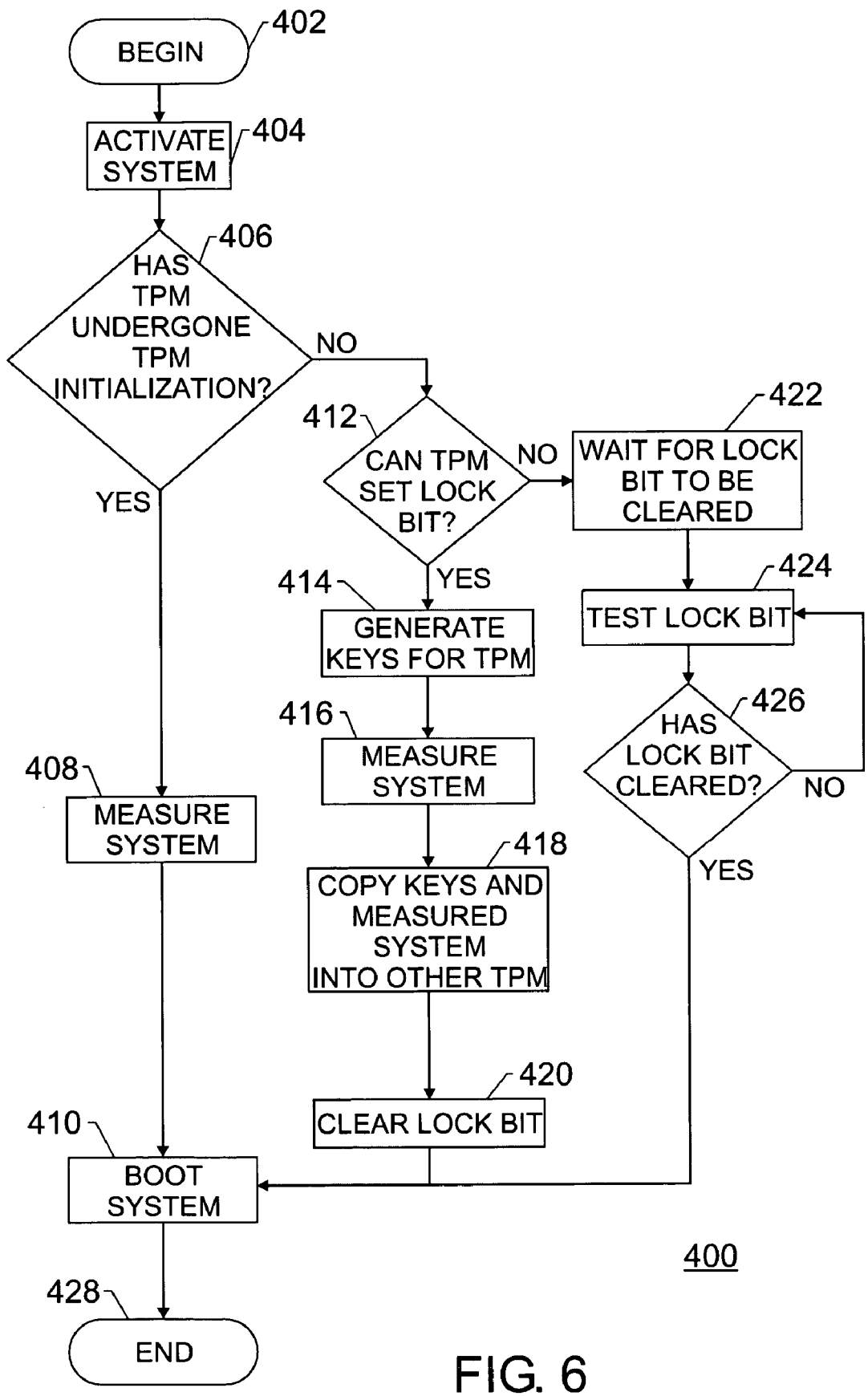
FIG. 6 is an alternative process flow diagram illustrating the use of a lock bit to coordinate the initialization of multiple trusted platform modules in accordance with embodiments of the present invention.

FIG. 6 is an alternative process flow diagram illustrating the use of a lock bit to coordinate the initialization of multiple trusted platform modules in accordance with embodiments of the present invention. The process flow diagram is generally referred to by reference numeral 400. Each of the TPMs within a system, such as the computer system 100 (FIG. 3), may perform the TPM initialization process illustrated in FIG. 6. As discussed above, the lock bit may be utilized to determine which TPM may be the controlling TPM for the computer system. In addition to providing keys to the subordinate TPM, the controlling TPM may provide measured system data for the subordinate TPM. Beneficially, by providing keys and measurement information, the computer system may initialize in a more efficient manner by decreasing the amount of time for the TPMs to initialize.

The process begins at block 402. At block 404, the system may be activated in a manner similar to block 304. At block 406, the TPM may determine whether it has undergone TPM initialization. If the TPM has undergone TPM initialization, then the TPM may measure the system, as shown in block 408. Then, the computer system may boot, as shown in block 410.

If a TPM determines that it has not undergone TPM initialization, it may utilize the lock bit to determine whether it is the controlling TPM. At block 412, the TPM may determine if it can set a lock bit. The determination of whether the TPM can set of the lock bit may be similar to the previous discussion regarding block 310. If the lock bit is set by the TPM, then the TPM may be defined to be the controlling TPM for the system. After the lock bit is set, the controlling TPM may generate keys, which may be used to hash or measure code in the system, as shown in block 414. At block 416, the controlling TPM may measure the code and configuration of the system, as discussed above with respect to block 408. The keys and the measurements may be copied from the controlling TPM to the subordinate or other TPM, as shown in block 418. Once the keys and measurements are copied into the other (subordinate) TPM, the lock bit may be cleared, as shown in block 420. Then, the computer system may boot, as shown in block 410.

If the TPM determines it cannot set the lock bit, then the TPM may be defined to be a subordinate TPM. At block 422, the subordinate TPM may wait for the lock bit to be cleared. The clearing of the lock bit may be similar to the description of block 318. Then, the subordinate TPM may test the lock bit, as shown in block 424. At block 426, the subordinate TPM may determine if the lock bit has been cleared, which may be similar to the discussion of block 322. If the subordinate TPM determines that the lock bit is still set, then the subordinate TPM may test the lock bit again, as shown in block 424. However, if the lock bit has been cleared, then the TPM may boot the system, as shown in block 410. The process ends at block 428.

Figure 7:
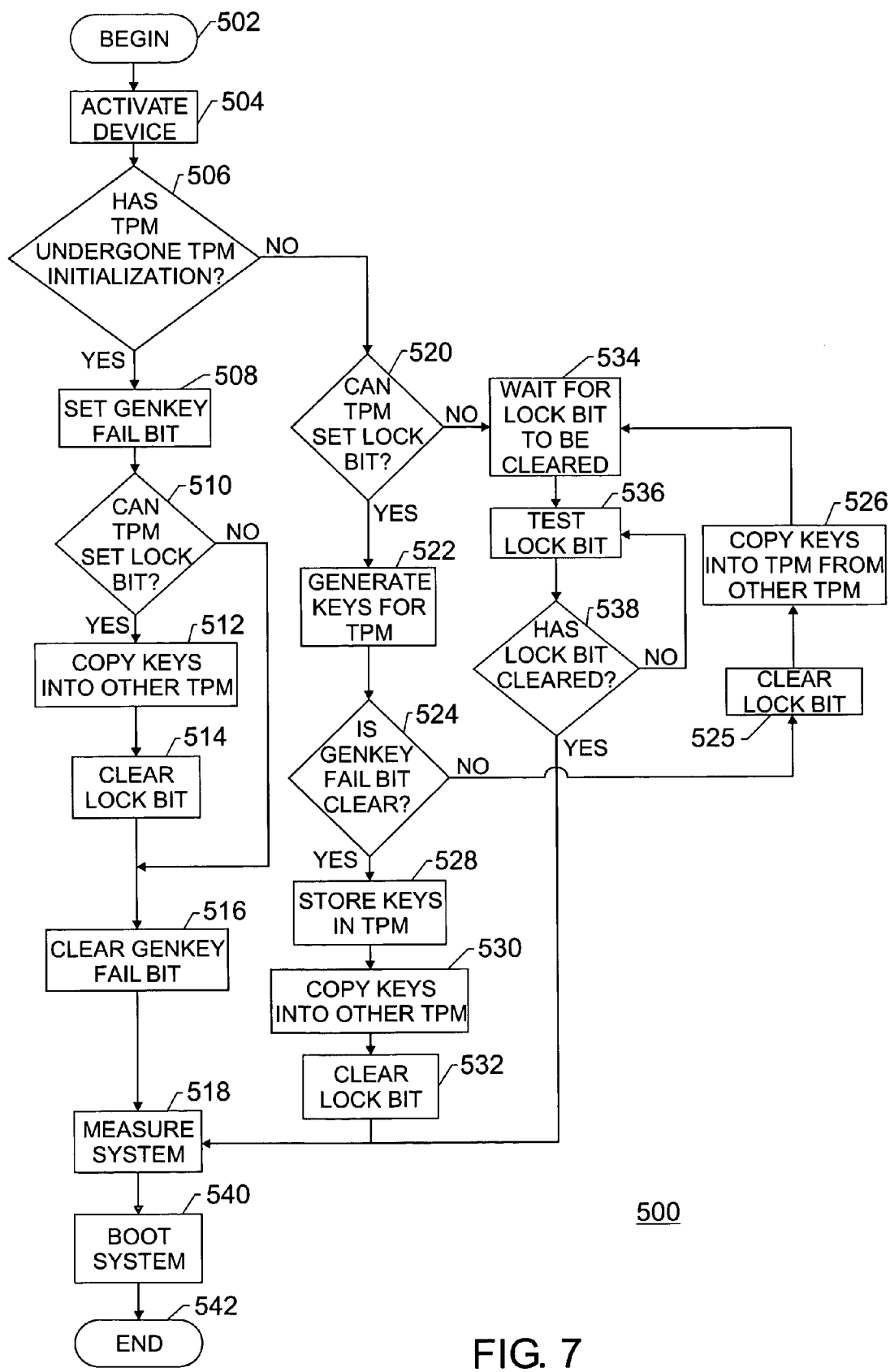
FIG. 7 is a process flow diagram illustrating the use of a lock bit and a genkey fail bit to coordinate the initialization of an additional trusted platform module in accordance with embodiments of the present invention.

FIG. 7 is a process flow diagram illustrating the use of a lock bit and a genkey fail bit to coordinate the initialization of an additional trusted platform module in accordance with embodiments of the present invention. The process flow diagram is generally referred to by reference numeral 500. In addition to the TPM initialization process for the system, the replacement or addition of a TPM, such as TPM 143 or 153 (FIG. 3), may result in one TPM having previously undergone TPM initialization, and the other TPM not having undergone TPM initialization. As shown in FIG. 7, a process flow diagram may utilize a lock bit and a genkey fail bit, such as the genkey fail bit 142 (FIG. 3), to coordinate the initialization of an additional TPM. When adding a TPM that has not undergone TPM initialization to the system, a TPM that has previously undergone TPM initialization may be the controlling TPM or the subordinate TPM. To coordinate the TPM initialization of the added TPM, an initialization setting, such as the genkey fail bit, may be used to prevent inconsistency or arbitrate the control between the new and initialized TPMs. Beneficially, the genkey fail bit may allow the non-initialized and initialized TPMs to be coordinated within the system.

The process begins at block 502. At block 504, the system is activated, which may be similar to block 304. At block 506, the TPM may determine whether it has previously undergone TPM initialization, as referenced in block 306. If the TPM has undergone TPM initialization, then the TPM may set the genkey fail bit, as shown at block 508. The genkey fail bit may be a setting or specific value that is located in memory, such as system RAM 106 or NVRAM 140 (FIG. 3). The genkey fail bit is accessible by the TPMs associated with the system. At block 510, the TPM may determine if it can set a lock bit. The determination whether the TPM can set of the lock bit may be similar to the discussion regarding block 310. If the lock bit is set by the TPM, then the TPM may be defined to be the controlling TPM. Accordingly, the controlling TPM may copy keys from itself to the other subordinate TPMs, as shown in block 512. At block 514, the lock bit may be cleared after the keys are copied into the other TPM. However, if the TPM cannot set the lock bit, then it may clear the genkey fail bit, as shown in block 516. The clearing of the genkey fail bit may include changing the information or setting within the section of memory associated with the genkey fail bit. Then, the TPM may measure the system in block 518. The measuring of the system may include the measurement of code and configurations, as previously discussed in blocks 204-214.

If the TPM has not previously undergone TPM initialization, then it may be a new or an additional TPM that is being added to the system. In such a case, the lock bit may be used to determine the controlling TPM. At block 520, the TPM may determine if it can set a lock bit. The determination may be similar to the discussion in block 510. If the lock bit is set by the TPM, then the TPM may generate keys for itself, as shown in block 522. At block 524, the TPM may determine if the genkey fail bit is clear. The determination of whether the genkey fail bit is clear may include examining a specific section of memory to determine a value or setting. If the genkey fail bit is set, then the TPM may be defined as a subordinate TPM. The subordinate TPM may clear the lock bit in block 525. Then, the subordinate TPM may copy the keys from the other TPM, as shown in block 526. At block 534, the subordinate TPM may wait for the lock bit to be cleared, which will be discussed below. However, if the genkey fail bit is cleared, then the TPM may be defined to be the controlling TPM. The controlling TPM may store the keys generated into itself, as shown in block 528. At block 530, the controlling TPM may copy the keys into the other (subordinate) TPM. After the keys are copied into the other TPM, the lock bit may be cleared, as shown in block 532. Then, the TPM may measure the system in block 518, as discussed above.

If the lock bit cannot be set in block 520, then the TPM may be defined to be the subordinate TPM. The subordinate TPM may wait for the lock bit to be cleared in block 534. Then, the subordinate TPM may test the lock bit, as shown in block 536 and previously discussed in block 318. At block 538, the subordinate TPM may determine if the lock bit has cleared. If the lock bit has been cleared, then the TPM may measure the system in block 518, as discussed above. Once the system has been measured by the TPM, the system may boot, as shown in block 540 and discussed above in block 216. The process ends at block 542.

Alternatively, it should be noted that the measurement of the system, which is discussed in block 518, may be performed after the keys are generated for the controlling TPM. Similar to the discussion in process diagram 400, the measurements of the system may be performed after blocks 510, 524, and 528 and before blocks 512, 526, and 530. After the keys are generated and stored in the controlling TPM, the system may be measured, as shown in block 518. Then, the keys and the system measurements may be copied into the other subordinate TPM in blocks 512, 526, and 530. Accordingly, after the genkey fail bit or lock bit are cleared in blocks 516, 532 and 538, the system may boot, as shown in block 540.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method of initializing a first security module in a computer, the method comprising the acts of:
   determining if the first security module is a controlling security module or a subordinate security module;
   generating at least one key if the first security module is the controlling security module;
   receiving at least one key from a second security module within the computer if the first security module is the subordinate security module;
   measuring the computer once the at least one key is generated; and
   copying the measurement of the computer into the subordinate security module.

2. The method, as set forth in claim 1, comprising the act of initializing the first and second security modules in the computer so that the first security module has at least one common key with the second security module.

3. The method, as set forth in claim 1, wherein the first security or second security module comprises a trusted platform module (TPM).

4. The method, as set forth in claim 1, wherein the controlling security module measures the computer.

5. The method, as set forth in claim 1, wherein the at least one key comprises an endorsement key.

6. The method, as set forth in claim 1, wherein the at least one key comprises a private key and a public key.

7. The method, as set forth in claim 1, comprising the act of accessing a lock bit to determine if the first security module is the controlling security module or the subordinate security module.

8. The method, as set forth in claim 7, wherein the lock bit is a setting within memory of the computer.

9. The method, as set forth in claim 8, comprising accessing the lock bit via a bus coupled to the first security module and the memory or via a bus and a input/output controller coupled between the first security module and the memory.

10. The method, as set forth in claim 8, comprising the act of determining if the first security module in the system is initialized.

11. A first security module in a computer, comprising:
a detector that is adapted to determine if the first security module is a controlling security module or a subordinate security module;
a key generator that generates a key for the first security module if the first security module is the controlling security module; and
a key receiver that receives the key from a second security module within the computer if the first security module is the subordinate security module;
wherein the controlling security module is adapted to measure the computer, and wherein the measurement of the computer obtained by the controlling security module is subsequently copied into the subordinate security module.

12. The first security module set forth in claim 11, wherein the first security module comprises a trusted platform module ("TPM").

13. The first security module set forth in claim 12, wherein the first security module is adapted to determine if the first security module has undergone TPM initialization.

14. The first security module, as set forth in claim 12, wherein the key comprises an endorsement key.

15. The first security module, as set forth in claim 12, wherein the key comprises a private key.

16. The first security module set forth in claim 11, wherein the first security module is adapted to measure the computer if the first security module is the controlling security module.

17. The first security module set forth in claim 11, wherein the first security module is adapted to access a lock bit to determine if the first security module is the controlling security module or the subordinate security module.

18. The first security module set forth in claim 17, comprising accessing the lock bit via a bus coupled to the first security module and memory or via a bus and a input/output controller coupled between the first security module and the memory.

19. A first security module in a computer, comprising:
means for determining if the first security module is a controlling security module or a subordinate security module;
means for generating at least one key for the first security module if the first security module is the controlling security module; and
means for receiving at least one key from a second security module within the computer if the first security module is the subordinate security module;
wherein the controlling security module is adapted to measure the computer, and wherein the measurement of the computer obtained by the controlling security module is subsequently copied into the subordinate security module.

20. A computer, comprising:
a processor;
memory operatively coupled to the processor;
a first security module and a second security module, each operatively coupled to the processor and the memory, the first and second security modules being configured to:
determine whether the first security module or the second security module is a controlling security module or a subordinate security module;
generate at least one key for the first security module or the second security module depending on whether the first security module or the second security module is the controlling security module; and
receive at least one key from the first security module or the second security module depending on whether the first security module or the second security module is the subordinate security module;
wherein the controlling security module is adapted to measure the computer, and wherein the measurement of the computer obtained by the controlling security module is subsequently copied into the subordinate security module.

21. The computer set forth in claim 20, wherein the first security module and the second security module each comprise a trusted plafform module ("TPM").

22. The computer set forth in claim 21, wherein the at least one key comprises an endorsement key.

23. The computer set forth in claim 21, wherein the at least one key comprises a private key and a public key.

24. The computer set forth in claim 20, wherein the first security module and the second security module are each adapted to determine if the first security module has undergone TPM initialization and if the second security module has undergone TPM initialization.

25. The computer set forth in claim 20, wherein the first security module and the second security module are adapted to access a lock bit to determine if the first security module is the controlling security module or the subordinate security module and to determine if the second security module is the controlling security module or the subordinate security module.

26. The computer set forth in claim 20, wherein the memory and the first security module are connected together on a bus and communicate through a bridge with the processor.

27. The computer set forth in claim 20, comprising non-volatile memory operatively coupled to the processor and configured to store data for the processor, wherein the memory is configured to store data retrieved from the non-volatile memory for use by the processor.

28. The computer set forth in claim 20, comprising a video controller operatively coupled to the processor and configured to produce a display signal.

29. A method of initializing a plurality of security modules in a computer, the method comprising the act of:
initializing each of the plurality of security modules so that each of the plurality of security modules has at least one common key, wherein initializing each of the plurality of security modules includes designating at least one of the plurality of security modules as being a controlling security module and designating at least one of the plurality of security modules as being a subordinate security module;
wherein the controlling security module is adapted to measure the computer, and wherein the measurement of the computer obtained by the controlling security module is subsequently copied into the subordinate security module.

30. The method, as set forth in claim 29, wherein each of the plurality of security modules comprises a trusted platform module ("TPM").

31. The method, as set forth in claim 29, comprising accessing a lock bit in memory by each of the plurality of security modules if the security module has not been initialized.

32. The method, as set forth in claim 31, wherein at least one of the plurality of security modules is coupled to a bus that connects to the memory.

33. The method, as set forth in claim 29, comprising booting the computer once the plurality of security modules is initialized.

34. A networked computer system comprising:
a plurality of computers;
a network coupled to each of the plurality of computers;
at least one of the plurality of computers comprising:
a first security module and a second security module, the first and second security modules being configured to:
determine whether the first security module or the second security module is a controlling security module or a subordinate security module;
generate at least one key for the first security module or the second security module depending on whether the first security module or the second security module is the controlling security module; and
receive at least one key from the first security module or the second security module depending on whether the first security module or the second security module is the subordinate security module;
wherein the controlling security module is adapted to measure the computer, and wherein the measurement of the computer obtained by the controlling security module is subsequently copied into the subordinate security module.

35. The system, as set forth in claim 34, wherein the first and the second security modules comprise a trusted platform module ("TPM").

* * * * *